May 2, 1944. E. J. OTTO 2,348,090
CONSTANT TENSION DRIVE
Original Filed May 8, 1940 4 Sheets-Sheet 1

Inventor
E. J. Otto
by
Attorney

May 2, 1944.    E. J. OTTO    2,348,090
CONSTANT TENSION DRIVE
Original Filed May 8, 1940    4 Sheets-Sheet 3

Inventor
E. J. Otto
by
Attorney

May 2, 1944.  E. J. OTTO  2,348,090
CONSTANT TENSION DRIVE
Original Filed May 8, 1940  4 Sheets-Sheet 4
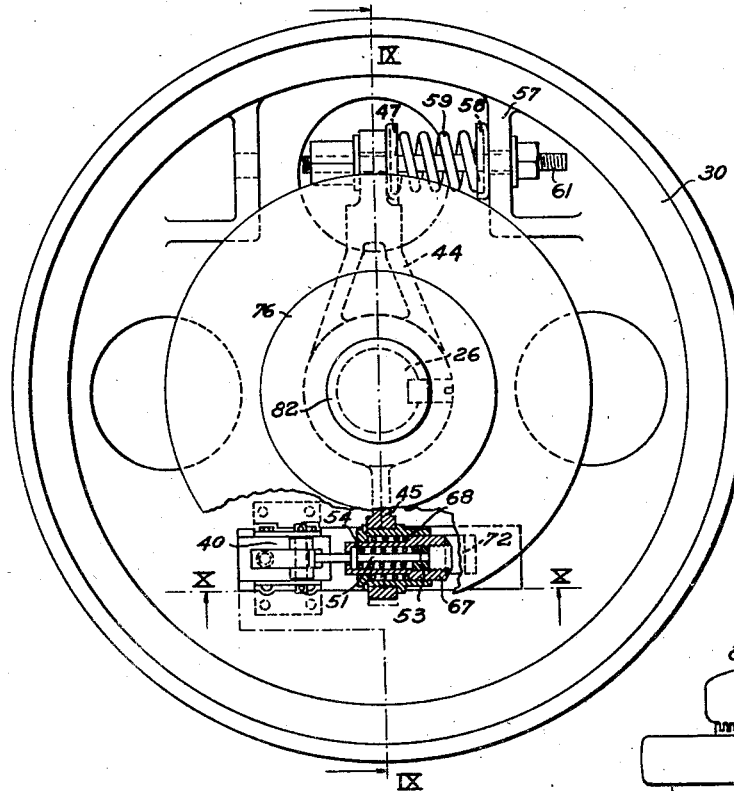
Fig. 8
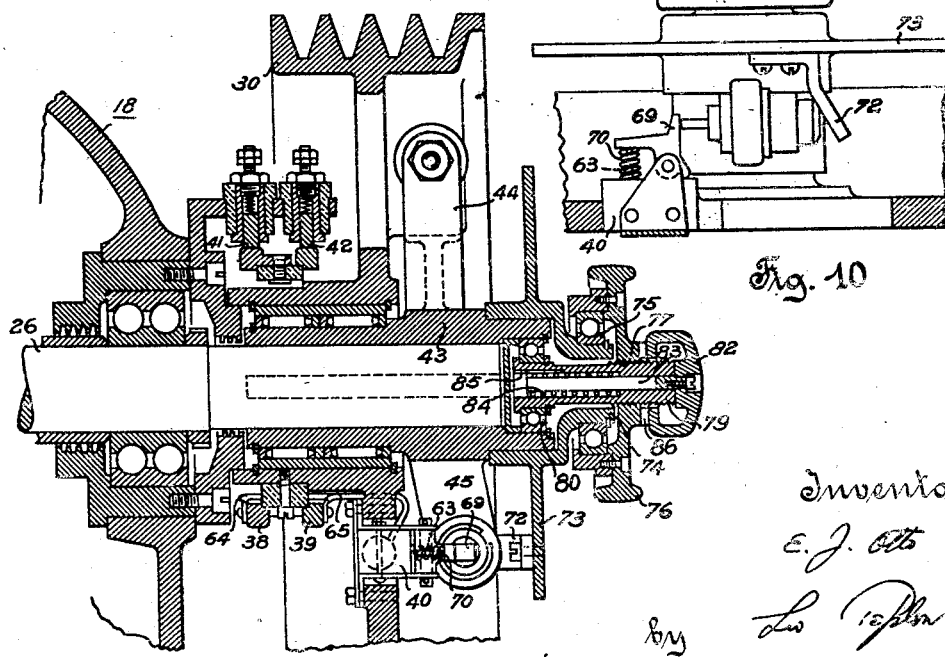
Fig. 10
Fig. 9
Inventor
E. J. Otto
by
Attorney

Patented May 2, 1944

2,348,090

UNITED STATES PATENT OFFICE 2,348,090

CONSTANT TENSION DRIVE

Eugene J. Otto, Milwaukee, Wis., assignor to Allis-Chalmers Manufacturing Company, Milwaukee, Wis., a corporation of Delaware Original application May 8, 1940, Serial No. 333,897, now Patent No. 2,346,047, dated April 4, 1944. Divided and this application October 10, 1941, Serial No. 414,400

9 Claims. (Cl. 200—52)

This invention relates to a transmission element which is of special utility in constant tension drives.

This application is a division of application S. N. 333,897, filed May 8, 1940.

In the treatment of continuous sheet, wire etc. material, it is often of the utmost importance to maintain a constant tension on the strip of material being wound or unwound, or in course of treatment. While many systems are known for obtaining constant tension under such circumstances, the present invention provides a drive of great simplicity and accuracy, and one which does not involve great expense.

It is an object of this invention to provide a power transmission element mounted on a shaft for limited angular movement thereon, with resilient means between said power transmitting element and its shaft, whereby the angular position of said power transmitting element on its shaft depends upon the torque transmitted by said transmission element.

A further object of this invention is to provide a sheave mounted for limited angular movement on a shaft, with spring means for biasing said sheave in one direction, a switch carried by said shaft, and means for closing said switch upon predetermined angular movement of said sheave on its shaft against the influence of said spring.

A further object of this invention is to provide means for adjusting the spacing between said switch contacts, which may be adjustable while the shaft is rotating.

A further object is to provide, in the mechanism recited above, a plurality of switches adapted to be closed at various relative angular positions of said shaft and sheave.

Other objects will become apparent from the following detailed description, taken in conjunction with the drawings, in which:

Fig. 8 is an elevation, partly in section, of a shaft and sheave similar to Fig. 2, but illustrating a modification in which the spacing between switch contacts is adjustable during rotation of the shaft;

Fig. 9 is a sectional view taken on line IX—IX of Fig. 8;

Fig. 10 is a detail view, partly in section, taken on line X—X of Fig. 8; and

Figure 1:
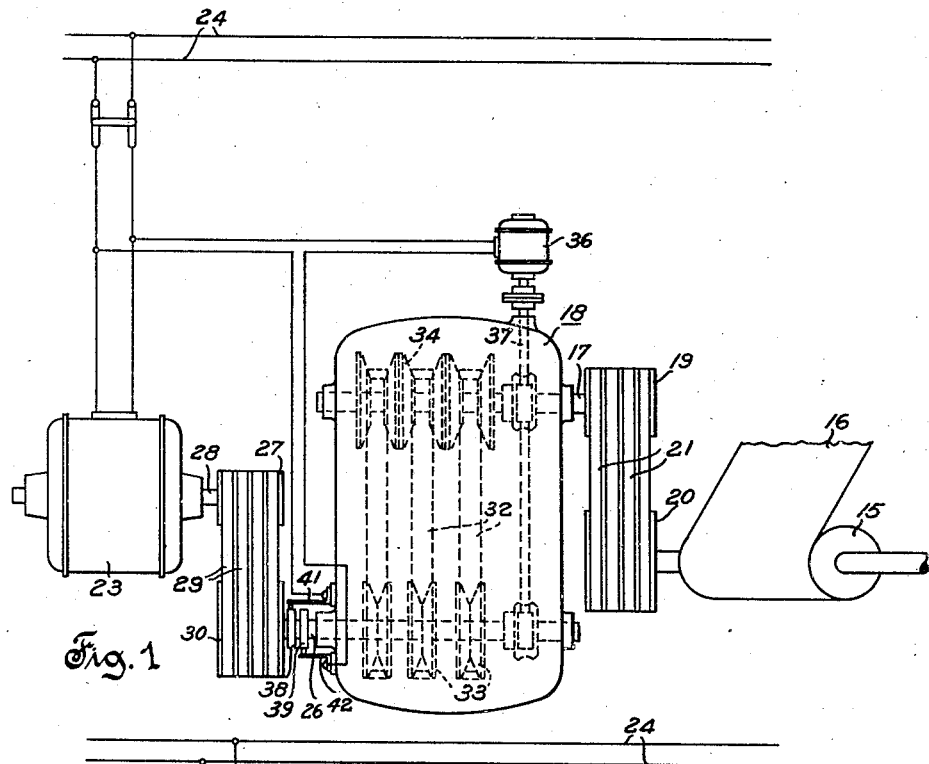
Fig. 1 is a diagrammatic showing of a constant tension drive in accordance with this invention.

While the drive of this invention is applicable to winding rolls, unwinding rolls, or intermediate rolls, it is shown in Fig. 1 as being applied to a winding roll 15, on which is wound the material to be tensioned, which is shown as a strip of brass or the like 16. Roll 15 is driven from output shaft 17 of speed changer 18, as by means of sheaves 19, 20 and belts 21. Constant speed motor 23, energized from a power source 24, is connected to drive input shaft 26 of speed changer 18 through sheave 27 on motor shaft 28, V-belts 29, and sheave 30 on shaft 26.

Speed changer 18 in this instance comprises input shaft 26 and output shaft 17 connected by a plurality of V-belts 32 connecting adjustable diameter sheaves 33 and 34. These sheaves comprise a plurality of conical disks adjustably spaced so that the relative spacing between cooperative disks determines the effective pitch diameter of each sheave. A pilot motor 36 drives worm actuator 37 which determines the relative spacing of the disks of sheaves 33 and 34, being arranged to increase the effective diameter of one sheave while decreasing the diameter of the other. In this way, energization of motor 36 alters the speed ratio of the input and output shafts 26, 17 of speed changer 18. Pilot motor 36 is energized from source 24 through a switch 40 carried on sheave 30, the contacts of said switch being connected to collector rings 38, 39 which are in contact with brushes 41, 42, respectively.

The details of the construction of speed changer 18 form no part of the present invention, and need not be described herein. A detailed description of the speed changer may be found in Patent No. 2,221,166 issued to Casper W. Heinrich and Eugene J. Otto on November 12, 1940. While this particular speed changer is described herein for purposes of illustration, it is clear that any other known type of speed changer may be substituted therefor.

With motor 36 normally deenergized, constant speed motor 23 normally drives winding roll 15 at a constant speed through speed changer 18. As the strip 16 builds up on roll 15, its effective diameter increases, and the material 16 is wound on roll 15 at a faster rate. This tends to increase the tension on strip 16, and the work done by motor 23 increases. Since the speed of the motor is substantially constant, the increased work done by the motor is reflected in a higher motor torque. As described below, this increase in torque is utilized to energize pilot motor 36 to reduce the speed of output shaft 17, thereby reducing the speed of rotation of roll 15, until equilibrium is reestablished. This reduction in the speed of roll 15 is repeated from time to time, until the winding step is completed.

Figure 2:
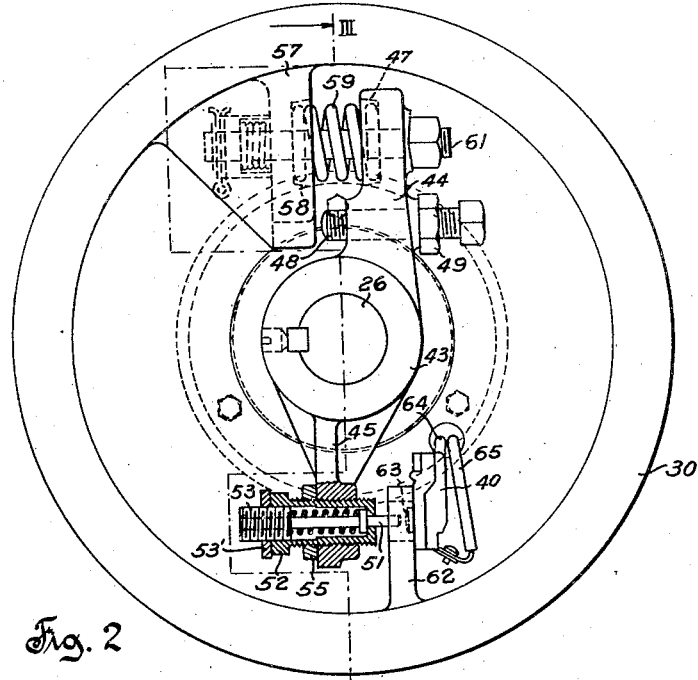
Fig. 2 is an elevation, partly in section, of a shaft and sheave illustrating a detail of the drive.
Figure 3:
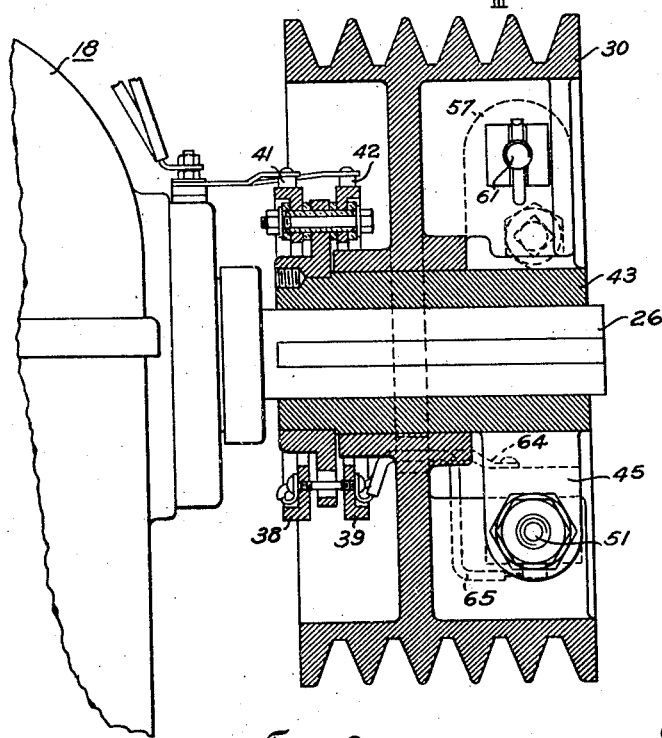
Fig. 3 is a sectional view taken on line III—III of Fig. 2.

Means for closing switch 40 in response to a change in torque on the motor drive is best shown in Figs. 2 and 3. This torque-responsive switch may be carried by either constant speed motor shaft 28 or constant speed input shaft 26 of the speed changer. As shown in Figs. 2 and 3, input shaft 26 carries fixed thereon a sleeve 43 provided with spring arm 44 and switch arm 45. Spring arm 44 has a spring seat 47 near the end thereof, and also carries an adjustable stop screw 48 retained in any desired position by lock nut 49.

Switch arm 45 carries a plunger 51 for actuating switch 40. Plunger 51 is slidably retained in the bore of plunger housing 52, and is biased to the right as seen in Fig. 2 by a spring 54 backed by plunger guide 53, the latter being retained by lock nut 53'. Housing 52 is threaded in a tapped bore in switch arm 45, and is retained by means of lock nut 55.

V-belt sheave 30 is freely mounted on sleeve 43 for limited angular movement with respect to shaft 26. The sheave is provided with an internal lug or abutment 57 which is provided with a spring seat 58 which cooperates with spring seat 47 to support a helical compression spring 59. A bolt 61 passes through spring arm 44, helical spring 59, and lug 57, being suitably retained at both ends to provide for the maximum desired spacing between arm 44 and lug 57. The minimum spacing between arm 44 and lug 57 is determined by the setting of stop screw 48 which cooperates with lug 57 to prevent too great a degree of movement between shaft 26 and sheave 30 after switch 40 has been closed.

Inward of its outer flange, sheave 30 carries a lug or bracket 62 which supports insulated switch 40, which is normally open but may be closed by a slight pressure on switch button 63. Leads 64 and 65 electrically connect the switch contacts (not shown) with collector rings 38 and 39, respectively, which are suitably supported on and insulated from sleeve 43. Brushes 41 and 42 connect with rings 38 and 39, respectively, to close the circuit to pilot motor 36 through switch 40.

The normal position of sheave 30 on shaft 26 is shown in Fig. 2. It is assumed that sheave 30 drives shaft 26 in a clockwise direction, as seen in Fig. 2. When the torque on shaft 26 exceeds a predetermined amount, sheave 30 moves clockwise with respect to shaft 26 against the pressure of spring 59. A predetermined degree of such relative movement results in engagement between plunger 51 and switch button 63 to close switch 40. The amount of movement necessary to actuate switch button 63 may be determined by axial adjustment of plunger housing 52 in arm 45. As pointed out above, the extent of relative angular movement between sheave 30 and shaft 26 is limited by stop screw 48.

Closing of switch 40 energizes pilot motor 36 to reduce the speed of output shaft 17 of the speed changer, thereby reducing the speed of roll 15 and the tension on strip 16. This in turn reduces the torque on shaft 26, whereupon sheave 30 resumes the normal position shown in Fig. 2, opening switch 40 and deenergizing pilot motor 36. The drive continues at its reduced speed until the tension tends to increase again. This operation is repeated a number of times during the winding operation, maintaining a substantially constant tension on strip 16.

While the construction of Figs. 2 and 3 has been described with reference to a winding roll, it will be understood that, by locating switch 40 on the opposite side of switch operating arm 45, and modifying the connections to pilot motor 36 to operate in the reverse direction upon closing switch 40, constant tension on an unwinding roll may be provided by repeatedly speeding up output shaft 17 as the strip 16 unwinds from roll 15.

One arrangement of this type is illustrated in Figs. 4-7, which illustrate a construction which may be utilized on a winding roll, an unwinding roll, or an intermediate roll, to maintain substantially constant tension thereon. As before, speed changer input shaft 26 carries sheave 30, freely mounted for limited angular movement with respect to the shaft. Sleeve 43 is fixedly mounted on shaft 26 and carries spring arm 44 and switch actuating arm 45. As in the modification of Fig. 2, compression spring 59 is mounted between sheave lug 57 and shaft arm 44, the maximum extension of the spring being determined by the setting of bolt 61, and the maximum compression of the spring being determined by the setting of stop screw 48.

Figure 4:
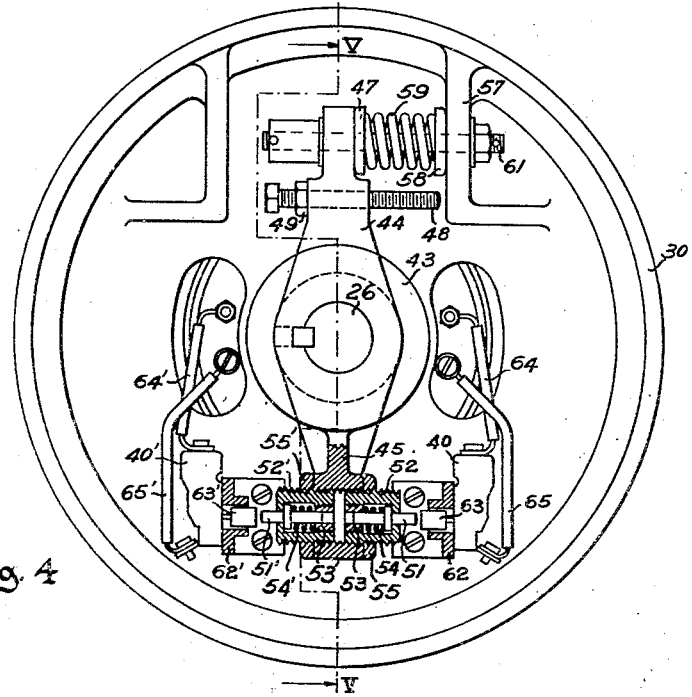
Fig. 4 is a view similar to Fig. 2, but illustrating a modification.
Figure 5:
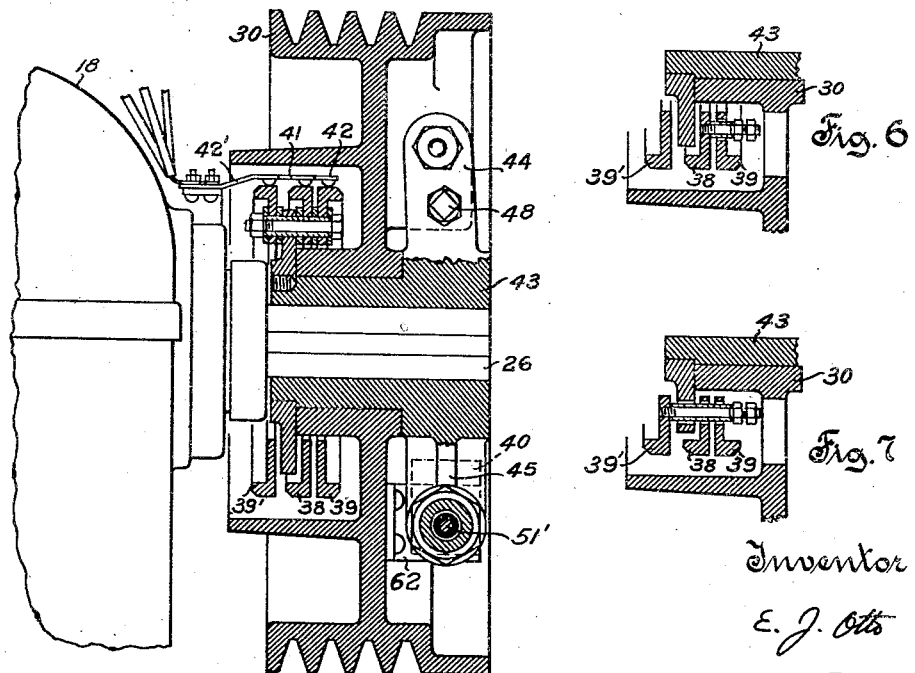
Fig. 5 is a sectional view taken on line V—V of Fig. 4.
Figure 6:
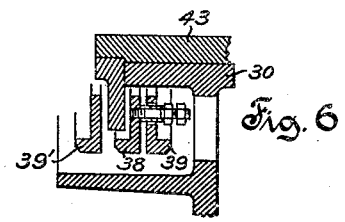
Figs. 6 and 7 are fragmental views illustrating details of circuit connections of the modification shown in Figs. 4 and 5.
Figure 7:
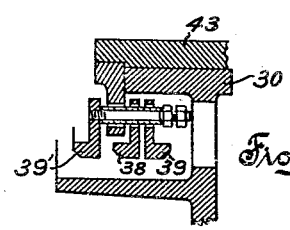

In the modification of Fig. 4, however, two switches 40 and 40' are provided, one on each side of switch arm 45. These switches are supported on sheave 30 by means of brackets or lugs 62, 62', respectively. In each case, the switch is operable by contact of plunger 51, 51' with switch button 63 or 63', plungers 51, 51' being adjustably carried by arm 45 as previously described. One contact from each switch is connected by leads 64, 64' with collector ring 38 (see Fig. 6); the other contact of switch 40 is connected to collector ring 39 by means of lead 65; while the remaining contact of switch 40' is connected to collector ring 39' by means of lead 65' (see Fig. 7). Current is taken from collector rings 39', 38 and 39 by means of brushes 42', 41 and 42, respectively, and connections are made from brushes 42', 41 and 42 in such manner (not shown) that when switch 40 is closed the pilot motor will be energized in one direction (to increase the speed of output shaft 17); when switch 40' is closed, the pilot motor will be energized in the opposite direction (to increase the speed of output shaft 17); and when both switches are open, the pilot motor is deenergized, and the speed ratio of speed changer 18 remains constant. Since such motor connections are well known and form no part of the present invention, they are not illustrated herein.

It will be understood that spring 59 is adjusted so that, at a predetermined desired tension, switch operating arm 45 will be maintained at the neutral position shown in Fig. 4, pilot motor 36 being deenergized. If the tension increases, assuming shaft 26 is driven by sheave 30 in a counterclockwise direction as seen in Fig. 4, sheave 30 will move slightly in a counterclockwise direction with respect to shaft 26 against the pressure of spring 59, until switch 40' is closed. Thereupon pilot motor 36 will be energized to operate in a direction to change the speed ratio of speed changer 18 to reduce the tension on strip 16. Should tension on strip 16 become reduced beyond a predetermined point, sheave 30 would move a few degrees in a clockwise direction with respect to shaft 26 under the influence of spring 59, to close switch 40. This would energize pilot motor 36 to operate in a direction to change the speed ratio of speed changer 18 to increase the tension on strip 16. Therefore the arrangement of Figs. 4–7 is applicable to winding rolls, unwinding rolls, or intermediate rolls of a strip mill.

The above modifications of the invention provide a tension responsive switch which operates satisfactorily where a predetermined, constant tension is desired. The degree of tension required to actuate the switch may be adjusted either by changing the preset compression of spring 59 or by axial movement of hollow screw or plunger casing 52 or 52', which changes the extent of relative angular movement of sheave 30 required to actuate switch 40 or 40'. But in order to effectuate either of these changes, it is necessary to stop the drive. Sometimes it is desired to alter the tension of the strip while the drive is in operation. For this purpose the modification illustrated in Figs. 8, 9 and 10 has been provided.

In this modification, sheave 30 is mounted for limited angular movement with respect to shaft 26, as before, with compression spring 59 carried between the sheave and shaft arm 44. Shaft arm 45 carries a slidable plunger case 67 which is biased to the right (Fig. 8) by compression spring 68. Plunger 51 is carried in plunger casing 67, and is biased to the left by spring 54, which is retained between a flange on plunger 51 and plunger guide 53. The extending end of plunger 51 abuts a bell crank lever 69 which is urged toward plunger 51 by spring 70. Switch button 63 is located within spring 70 and is adapted to be actuated by counterclockwise movement of bell crank lever 69, Fig. 10.

Plunger carrier 67 is slidably supported in a guide in arm 45 and is biased to the left under the action of spring 68, as seen in Fig. 8. The axial position of plunger carrier 67 is determined by a cam 72. As shown in Fig. 10, cam 72 is inclined with respect to the axis of plunger case 67, and movement of cam 72 axially of shaft 26 determines the initial axial position of plunger case 67, thereby determining the extent of relative angular movement between shaft 26 and sheave 30 required to actuate switch 40.

Cam 72 is supported on a disk 73 which is supported at one end of sleeve 43 for limited movement axially of said sleeve. The reduced end 74 of the hub of disk 73 carries a frictionless thrust bearing 75. Handwheel 76 is fixed to the outer race of bearing 75, and is threaded at 77 to cooperate with the threaded portion of hollow actuating screw 79, the inner end of which is fixedly supported in the inner race of frictionless bearing 80, the outer race of which is fixedly mounted in the end of sleeve 43. Actuating knob 82 is connected with a plunger 83 which is biased inward by means of spring 84. As indicated at 85, plunger 83 is splined in actuating screw 79, permitting axial movement between plunger 83 and actuating screw 79, but preventing rotary movement therebetween. A clutch 86 is provided between knob 82 and handwheel 76.

Normally knob 82 and handwheel 76 are clutched together due to the action of spring 84 on plunger 83. During rotation of shaft 26 and sheave 30, knob 82 and handwheel 76 and the parts connected thereto may be stationary, or may rotate with the shaft and sheave. If it be desired to move cam 72 to change the setting of switch operating plunger casing 67, handwheel 76 may be grasped with one hand to hold it stationary, while knob 82 is pulled outwardly out of clutching engagement with handwheel 76. Knob 82 is then turned angularly, this angular movement being transmitted to actuating screw 79 through splined plunger 83. Actuating screw 79 being retained against axial movement by frictionless thrust bearing 80, rotation of actuating screw 79 results in axial movement of handwheel 76, the hub of which is in threaded engagement with actuator screw 79. Axial movement of handwheel 76 is transmitted to disk 73 through thrust bearing 75, thereby causing axial movement of cam 72 which determines the position of plunger casing 67. It is clear from the above description that the modification illustrated in Figs. 8, 9 and 10 provides means for determining and changing, while the drive is in operation, the amount of angular movement between sheave 30 and shaft 26 required to close switch 40.

While the description herein refers to a V-belt sheave 30, it is clear that it would be within the scope of this invention to utilize a flat belt pulley, a gear, or other mechanical power transmitting element on shaft 26 in lieu of sheave 30, and the word "pulley" as used in the claims is intended to include such power transmitting elements. Furthermore, while the description relates to the spring biased sheave being mounted on speed changer input shaft 26, it could equally well be mounted on motor shaft 28 or any shaft intermediate these. Obviously, the spring biased sheave may be utilized anywhere on the input side of the speed changer. The spring-biased sheave is also obviously applicable to other types of drives, whether used to maintain constant tension or for other purposes.

Figure 11:
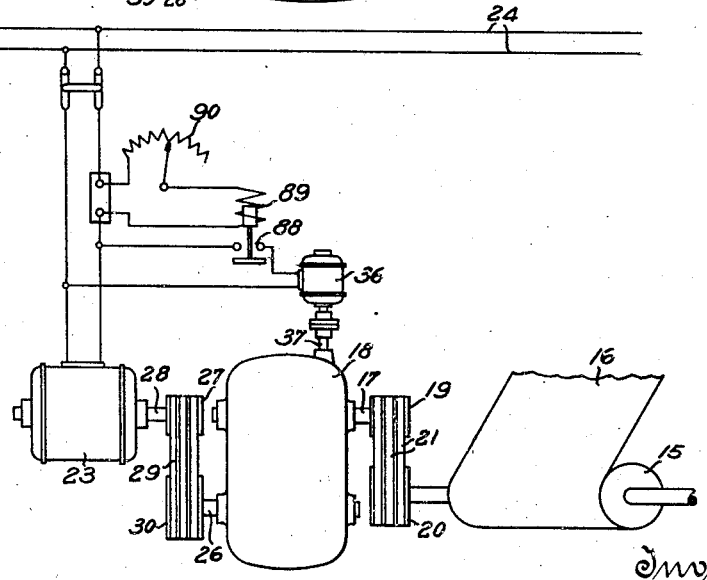
Fig. 11 is a diagrammatic view showing a modification of the drive illustrated in Fig. 1.

A further modified construction in accordance with this invention is illustrated in Fig. 11, wherein a motor 23, energized from power source 24, drives winding roll 15 through a speed changer 18. The latter is adapted to have its speed ratio between input shaft 26 and output shaft 17 changed by means of pilot motor 36. Pilot motor 36 is energized by normally open switch 88 operable by current responsive relay 89, which can be adjusted to operate at any desired current by means of adjustable rheostat or other impedance 90.

If, during the winding operation, tension on strip 16 increases, the torque on motor 23 will increase and motor 23 will draw a heavier current from line 24. Upon a predetermined increase of current to motor 23, current responsive relay 89 will close switch 88 energizing pilot motor 36 to reduce the speed of output shaft 17 and roll 15. When the speed of roll 15 has been reduced sufficiently to restore the tension on strip 16 to a desired value, the torque on motor 23 will return to normal, the current taken by motor 23 will return to normal, relay 89 will open switch 88, and pilot motor 36 will be de-energized until the tension should again increase.

While specific modifications of the invention have been illustrated and described, it will be understood that modifications and equivalents such as readily occur to those skilled in the art are included within the scope of this invention which is intended to be limited only by the scope of the claims appended hereto.

It is claimed and desired to secure by Letters Patent:

1. Power transmitting mechanism comprising a pulley provided with an internal abutment and freely mounted on a shaft for limited angular movement with respect thereto, said shaft being provided with an abutment fixed thereto within said pulley, and a compression spring retained between said abutments, said spring being of such stiffness as to transmit the normal load torque of said mechanism and to yield when said mechanism is subjected to higher than normal torque, an electrical switch carried by said pulley and provided with an actuator, and a cooperating abutment carried by said shaft in position to contact said actuator to close said switch upon relative angular movement of said pulley and said shaft.

2. Power transmitting mechanism comprising a rotatable shaft, a power transmitting element mounted on said shaft for limited angular movement with respect thereto, resilient means interposed between said power transmitting element and said shaft, said resilient means having sufficient stiffness to transmit the normal load torque of said mechanism between said shaft and said element and to yield upon the occurrence of a torque greater than normal, switch actuating means carried by said shaft, and a switch carried by said transmitting element on each side of said switch actuating means in position to be actuated thereby upon predetermined angular movement in either direction of rotation of said transmitting element relative to said shaft.

3. Power transmitting mechanism comprising a rotatable shaft, a pulley mounted on said shaft for limited rotary movement relative thereto, an electrical switch carried by said pulley, a cooperating switch actuator carried by said shaft in position to actuate said switch upon relative rotary movement between said pulley and shaft; and means for adjusting the normal spacing between said actuator and switch comprising a cam carried by said shaft and movable axially thereof; resilient means for urging said actuator into mechanical contact with said cam, and means operable during rotation of said shaft for axially moving said cam.

4. Power transmitting mechanism as defined in claim 3 wherein said cam moving means comprises a threaded member rotatably mounted on said shaft and axially fixed with respect thereto, a cam carrying member splined on said shaft, and an adjusting member axially fixed with respect to said cam carrying member and rotatable with respect thereto, said adjusting member being threadably engaged with said threaded member.

5. Power transmitting mechanism as defined in claim 3 wherein said cam moving means comprises a threaded member rotatably mounted on said shaft and axially fixed with respect thereto, a cam carrying member splined on said shaft, an adjusting member axially fixed with respect to said cam carrying member and rotatable with respect thereto, said adjusting member being threadably engaged with said threaded member, and resilient means for clutching said threaded member to said cam adjusting member against relative rotary movement therebetween.

6. A power transmitting mechanism comprising a rotatable power transmitting element, a second rotatable power transmitting element arranged for limited angular movement with respect to said first power transmitting element, a switch carried by one of said elements, and means responsive to a change in torque transmitted by said mechanism for actuating said switch, said means being arranged to transmit the normal load torque from one to the other of said elements.

7. A power transmitting mechanism comprising a rotatable shaft, a pulley mounted on said shaft for limited rotary movement relative thereto, a spring biasing said pulley in one angular direction on said shaft, said spring being of sufficient stiffness to transmit the normal load torque of said mechanism without substantial yielding and to yield upon the occurrence of a torque greater than normal, an electrical switch carried by said pulley, a cooperating switch actuator carried by said shaft in position to actuate said switch upon predetermined relative rotary movement between said pulley and said shaft; and means for adjusting the normal spacing between said actuator and switch comprising a cam carried by said shaft and movable axially thereof, resilient means for urging said actuator into mechanical contact with said cam, and means operable during rotation of said shaft for axially moving said cam.

8. Power transmitting mechanism comprising a pulley provided with an internal abutment and freely mounted on a shaft for limited angular movement with respect thereto, said shaft being provided with an abutment fixed thereto within said pulley, and a compression spring retained between said abutments, said spring being of such stiffness as to transmit the normal load torque of said mechanism and to yield when said mechanism is subjected to higher than normal torque, an electrical switch carried by said pulley and provided with an actuator, and a cooperating abutment carried by said shaft in position to contact said actuator to close said switch upon relative angular movement of said pulley and said shaft, said cooperating abutment comprising an element mounted for angular adjustment relative to said shaft for adjusting the normal spacing between said actuator and said cooperating abutment.

9. Power transmitting mechanism comprising a pulley provided with an internal abutment and freely mounted on a shaft for limited angular movement with respect thereto, said shaft being provided with an abutment fixed thereto within said pulley, and a compression spring retained between said abutments, said spring being of such stiffness as to transmit the normal load torque of said mechanism and to yield when said mechanism is subjected to higher than normal torque, an electrical switch carried by said pulley and provided with an actuator, a cooperating abutment carried by said shaft in position to contact said actuator to close said switch upon relative angular movement of said pulley and said shaft, said cooperating abutment comprising an element mounted for angular adjustment relative to said shaft for adjusting the normal spacing between said actuator and said cooperating abutment, and means operable during operative rotation of said power transmitting means for adjusting said element.

EUGENE J. OTTO.